Patented Aug. 8, 1933

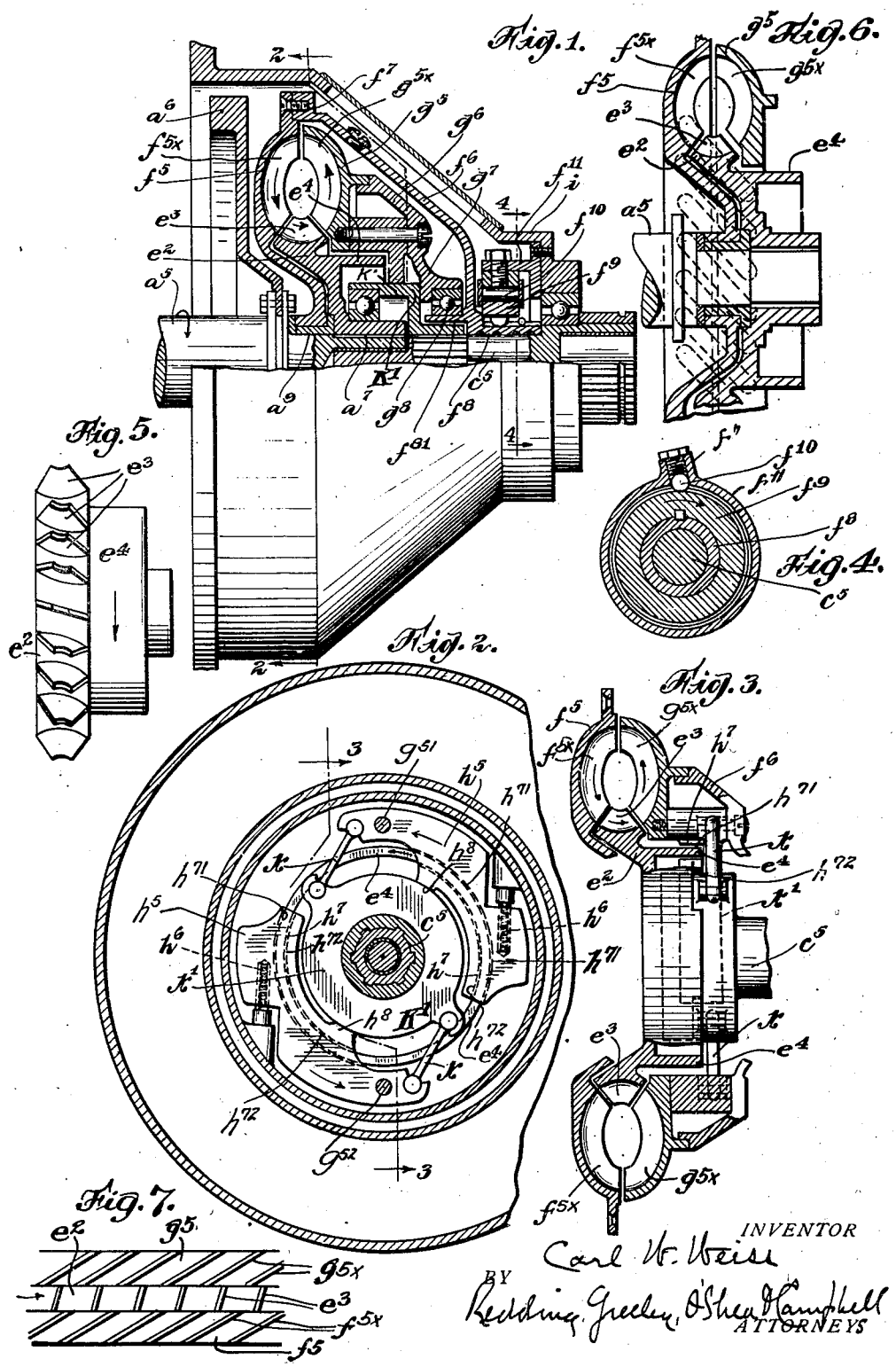

1,921,014

UNITED STATES PATENT OFFICE 1,921,014

TRANSMISSION

Carl W. Weiss, Brooklyn, N. Y.

Application March 2, 1929. Serial No. 343,944

4 Claims. (Cl. 60—54)

This invention relates to hydraulic power transmitting devices of the type of those shown in my application for Letters Patent of the United States Serial No. 269,620, filed April 13, 1928, patented Sept. 8, 1931, No. 1,822,555, in which power is transmitted through the medium of a liquid caused to acquire a vortical movement. In the forms of transmission shown and described in said application there are pivotally mounted on the rotor centrifugal bodies normally in inactive position but adapted to engage the impeller when the speed of rotation of the rotor or driven element attains the predetermined degree at which the driving shaft is to be connected to the driven shaft for transmission of power at a 1:1 ratio. The object of the present invention has been to make the transmission of power at a 1:1 ratio depend on torque as well as speed so that the engagement of the driving shaft and the driven shaft for transmission at a 1:1 ratio shall not be effected until the torque resistance is reduced or the speed of rotation is sufficient to overcome the torque resistance of the driven shaft. Such a condition might obtain, for example, when a motor car is to be accelerated from a stand still or is driven up a hill. Under such a condition, in accordance with the present invention, the motor can be accelerated to a maximum horsepower before engagement of the driving shaft with the driven shaft is effected. In accordance with the present invention the driven element or rotor is not, as before, directly secured to the driven shaft, but there is provided a connection between the driven shaft and the centrifugal bodies in such manner that the centrifugal bodies are restrained from engaging the driving element or impeller until the torque resistance is reduced or the speed of rotation is increased sufficiently to overcome the torque resistance of the driven shaft. In the accompanying drawing, in which the present invention is illustrated—

Figure 1 is a view partly in longitudinal section and partly in elevation, of a transmission in which is incorporated the present invention.

Figure 2 is a view in transverse section on the plane indicated by the broken line 2—2 of Figure 1, looking in the direction of the arrows.

Figure 3 is a view in section on the plane indicated by the broken line 3—3 of Figure 2.

Figure 4 is a detail view of the reaction device on the plane indicated by the broken line 4—4 of Figure 1.

Figure 5 is a view in edge elevation of the impeller, illustrating particularly the arrangement of the blades.

Figure 6 is a partial view in section, similar to Figure 1, with broken lines indicating diagrammatically the relation of the pockets between the blades of the reaction member and the pockets between the blades of the driven member.

Figure 7 is a diagrammatic view further illustrating the relations of the blades of the impeller, the reaction member, and the driven member.

The driving shaft $a^5$ is shown as having secured thereto a flywheel $a^6$ and as having keyed thereon, as at $a^7$, a driving element or impeller $e^2$, which is shown as having its radial blades $e^3$ set at slight angle to the planes of its axis. The reaction member $f^5$, having its blades set obliquely and mounted rotatably on the reduced portion $a^9$ of the driving shaft, forms a part of the inner housing within which is contained the liquid which is to have imparted to it a vortical movement. The other part of the housing is formed by a shell $f^6$ which is bolted at its periphery to the flange of the reaction member $f^5$, as indicated at $f^7$, has a bearing at $f^8$ on the driven shaft $c^5$, and has keyed on its hub an inner member $f^9$ of the reaction device which, as shown in Figures 1 and 4, is formed in the manner of a ball brake of the one-way type having a ball $f^{10}$ carried by a stationary part $f^{11}$ supported by a protective housing $i$. Through the reaction device and the shell $f^6$ the reaction member $f^5$ is held from rotation in one direction, but is permitted to rotate freely in the opposite direction.

It will be noted that the blades $g^{5x}$ of the driven member $g^5$ are inclined in one direction with respect to the axis of the transmission and that the blades $f^{5x}$ of the reaction member $f^5$ are oppositely inclined, all as indicated in Figures 6 and 7, and that the pockets between the blades are similarly inclined in opposite directions. When operative movement of the transmission is commenced, at first slowly, the liquid within the annular chamber formed between the driven member, the reaction member, and the impeller, has imparted to it a vortical movement about a center which lies between the blades of the driven member on the one hand and the blades of the reaction member on the other hand, entering the pockets which are inclined oppositely with respect to the movement of the mass, that is, the pockets of the driven member, and being drawn from the pockets of the reaction member and passing, near the perimeter of the annular chamber where the blades of the two members approach each other closely, from the pockets of the driven member into the pockets of the reaction member. As the speed of the impeller is increased this vortical movement of the liquid is not only continued but accelerated and at a relatively high speed of the impeller centrifugal action of the vortex is so increased that a vacuum is formed at the center of the vortex and centrifugal action with respect to the axis of the transmission ceases. When such vortical movement is established the driven member $g^5$ is caused to rotate about the axis of the transmission. It will be understood that the establishment of such vortical movement of the liquid is not dependent, within reasonable limits, upon the inclination of the blades of the impeller although when they are inclined at about 15° with respect to the axis of the transmission the acceleration of the vortical movement is increased and higher efficiency of the transmission is attained.

The driven element or rotor member $g^5$, instead of being directly connected to the driven shaft $c^5$, as in the said application Serial No. 269,620, is supported through a web $g^6$ and its hub $g^7$ and a ball bearing $g^8$ on a cylindrical flange $f^{81}$ of the shell $f^6$ which, as before stated, has a bearing at $f^8$ on the driven shaft $c^5$. The driven element or rotor $g^5$ has pivotally mounted thereon as at $g^{51}$ centrifugal bodies $h^5$ held normally in inactive position, against centrifugal action, by springs $h^6$ and having each a foot $h^7$ adapted to engage a drum or cylindrical flange $e^4$ formed with the impeller $e^2$, each foot $h^7$ being shown as slotted from one side, as indicated by broken lines at $h^{71}$ in Figure 2, and by full lines in Figure 3, to receive the edge of the flange $e^4$. The inner wall $h^{72}$ of this slot $h^{71}$ is moved by centrifugal action against the inner wall of the flange $e^4$ to effect driving connection. Each body $h^5$ has a stop $h^8$ which, in the inactive position, of the body, rests against the collar $k^1$.

In the construction shown and described in said application Serial No. 269,620 the centrifugal bodies $h^5$ engages the drum $e^4$ of the driving element or impeller $e^2$ when the speed of rotation of the driven element or rotor attains the predetermined degree at which the driving shaft is to be connected directly to the driven shaft for transmission of power at a 1:1 ratio, without regard to the torque resistance. In the present case, however, the heel of each centrifugal body $h^5$ is connected through a link $k$ with the driven shaft $c^5$, such engagement being conveniently effected through a collar $k^1$ which is keyed or otherwise secured to the driven shaft $c^5$. Through such connection the torque resistance of the driven shaft tends to restrain the outward movement of the foot $h^7$ of each centrifugal body and so prevent the connection between the driving shaft and the driven shaft necessary for the transmission of power at a 1:1 ratio until either the torque resistance of the driven shaft is reduced or the speed of rotation of the rotor has increased sufficiently to cause the foot of each centrifugal body to move under the influence of centrifugal action into engagement with the drum $e^4$ of the impeller $e^2$, by which torque connection between the driving shaft and the driven shaft for transmission of power at a 1:1 ratio is effected. The connection between the driven shaft and the centrifugal bodies, through the links $k$, thus constitutes a torque responsive means for the control of the engagement of the impeller with the driven shaft for the transmission of power at a 1:1 ratio.

While the invention has been explained in its application to a form of hydraulic transmission in which the two members $f^5$ and $g^5$ are placed face to face, forming between them a vortex chamber, in which a vortical movement of the liquid is set up, dependent, in the particular construction shown, upon the speed of the impeller, as fully explained in the said application Serial No. 269,620, it will be understood that the torque control which forms the subject of the present invention, might be applied to other forms of transmissions and that the invention, therefore, is not limited to its application to the particular form of transmission shown and described herein.

I claim as my invention:

1. In a power transmission mechanism the combination of an impeller, a rotor, a centrifugal body carried by the rotor and adapted under the influence of centrifugal action to effect driving connection between the impeller and the rotor, a driven part, and a torque responsive connection between the driven part and the centrifugal body to control the engagement of the centrifugal body with the impeller.

2. In a power transmission mechanism the combination of an impeller, a rotor, a centrifugal body carried by the rotor and adapted under the influence of centrifugal action to effect driving connection between the impeller and the rotor, a driven part, and a link connection between the driven part and the centrifugal body to control the engagement of the centrifugal body with the impeller in accordance with variations in the torque resistance in the driven part.

3. In a power transmission mechanism the combination of an impeller having a drum, a rotor, a centrifugal body carried by the rotor and adapted under the influence of centrifugal action to effect driving connection between the drum of the impeller and the rotor and having a heel, a driven part, and a connection between the driven part and the heel of the centrifugal body to restrain movement of the centrifugal body under the influence of centrifugal action.

4. The combination of a driving element, a driven element, a centrifugal body carried by the driven element and adapted under the influence of centrifugal action to effect driving connection between the driving element and the driven element, means for imparting initial movement to the driven part, and a torque responsive connection between the driven part and the centrifugal body to control the engagement between the driving element and the driven element.

CARL W. WEISS.